United States Patent [19]

Drudy

[11] 4,326,560
[45] Apr. 27, 1982

[54] APPARATUS FOR INJECTING FLUIDS INTO AGGREGATES

[75] Inventor: William A. Drudy, Macungie, Pa.
[73] Assignee: R.F.I. Inc., Farmingdale, N.Y.
[21] Appl. No.: 194,057
[22] Filed: Oct. 6, 1980
[51] Int. Cl.³ ............................................. F16K 19/00
[52] U.S. Cl. ...................................... 137/897; 366/10; 366/40
[58] Field of Search ................... 137/896, 897; 366/3, 366/5, 6, 10, 11, 34, 40, 167

[56] References Cited

U.S. PATENT DOCUMENTS

| 1,087,086 | 2/1914 | Hand | 366/11 |
|---|---|---|---|
| 1,153,132 | 9/1915 | Pettitt | 366/11 |
| 1,784,503 | 12/1930 | Swann | 366/11 |
| 1,848,122 | 3/1932 | Forster | 366/11 |
| 2,231,489 | 2/1941 | Anderson et al. | 366/11 |
| 2,543,517 | 2/1951 | Anderson | 366/11 X |
| 2,577,664 | 12/1951 | Pro | 366/11 |
| 3,788,353 | 1/1974 | Breunsbach | 137/897 |
| 3,912,238 | 10/1975 | Richard | 366/10 |

FOREIGN PATENT DOCUMENTS 320682 5/1957 Switzerland ............... 366/10

Primary Examiner—Robert G. Nilson
Attorney, Agent, or Firm—Eisenman, Allsopp & Strack

[57] ABSTRACT

There is disclosed an apparatus for injecting fluids into flowing aggregates such as injecting water into a traveling dry cementitious mix in which a substantially annular fluid slot surrounds the flow path for the aggregate to establish an inwardly moving sheet of fluid to impinge on the aggregate.

1 Claim, 14 Drawing Figures

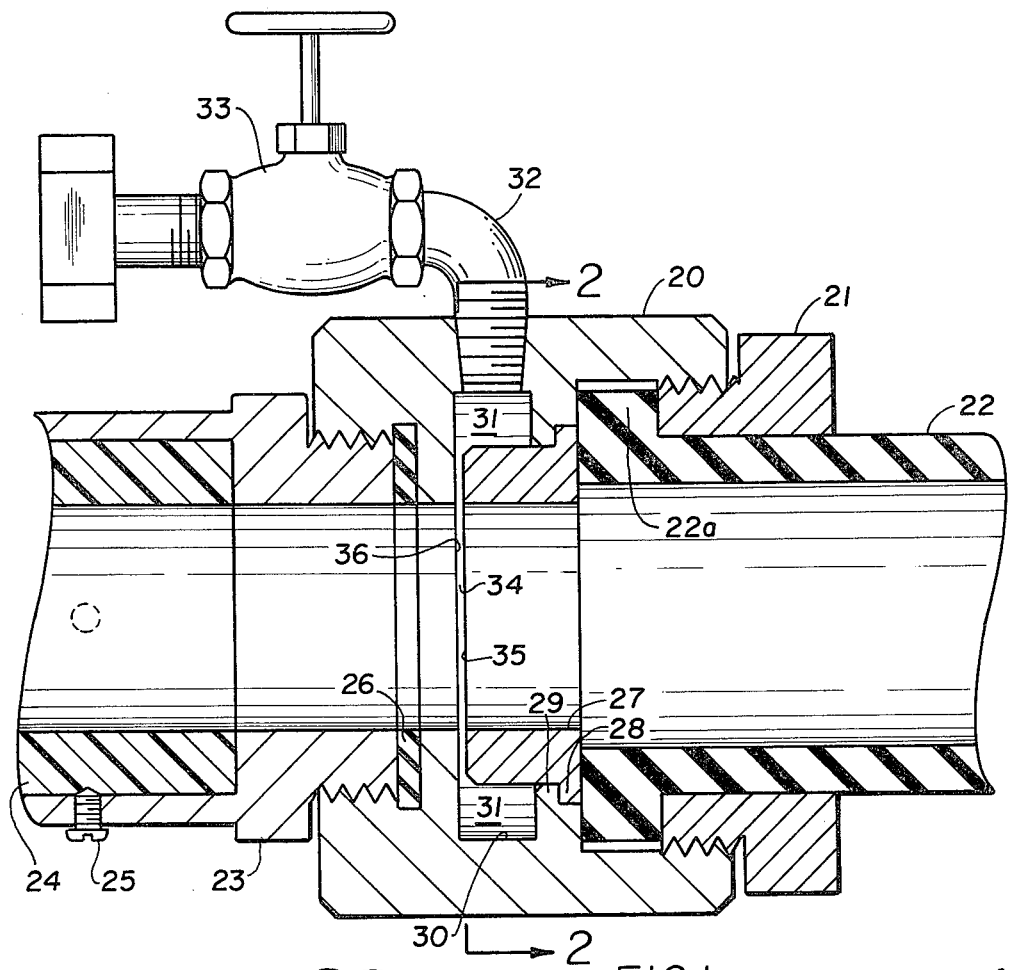
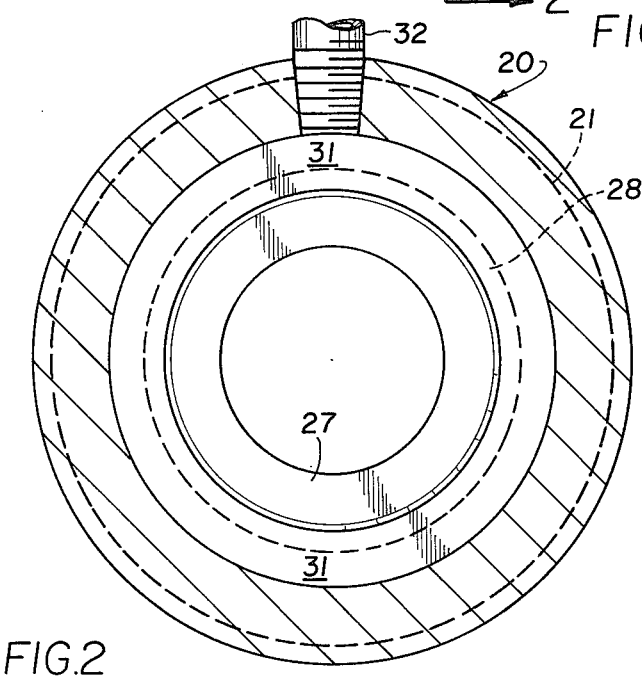
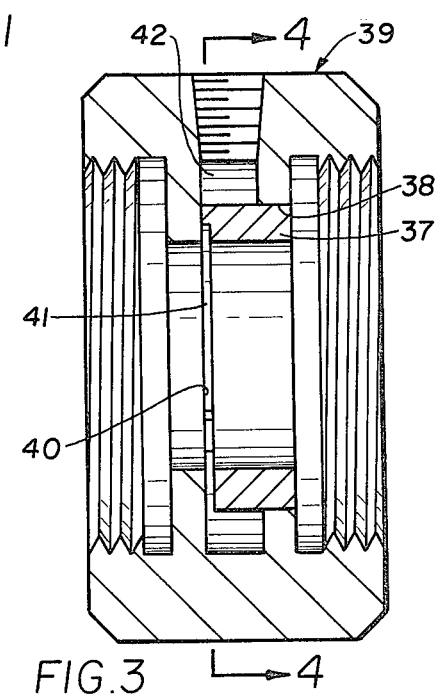

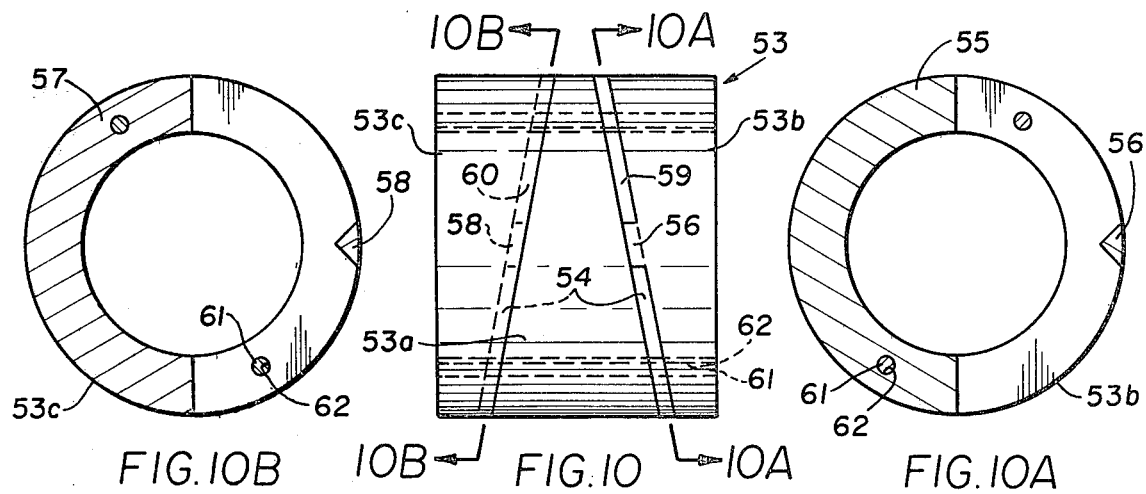
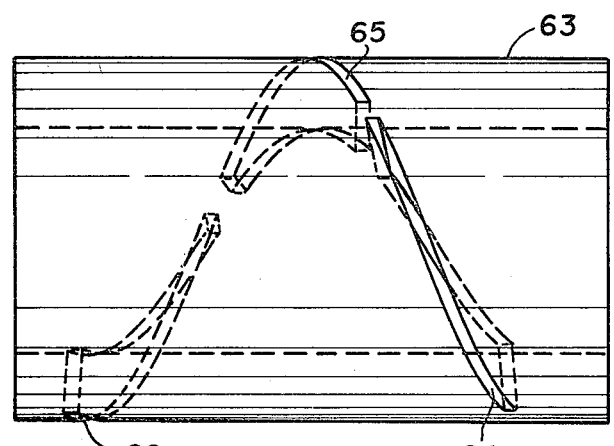
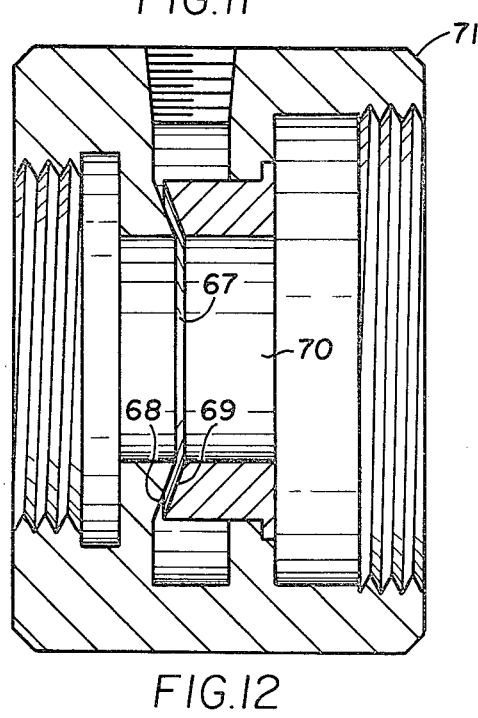

APPARATUS FOR INJECTING FLUIDS INTO AGGREGATES

BACKGROUND OF THE INVENTION

This invention relates to the handling and treating of aggregates such as mixtures of sand and cement flowing through a conduit or hose and embraces the art of shotcreting or guniting in which the dry aggregate is injected with water and sprayed into position from a nozzle.

Since its inception, the art of spraying aggregates such for example as wet concrete has involved the use of a fluid body through which the dry mix is passed at high velocity and within which a fluid, typically water, is injected into the mix which is then sprayed from the nozzle as a wet concrete mix capable of adhering on surfaces to harden into a structural part. The proportions of fluid and aggregate must be controlled with absolute precision. If the sprayed mix is too dry, it bounces from its target and if too wet, will not remain in place to harden. The injection of fluid into the aggregate has been accomplished heretofore by means of fluid or water rings having an axial central opening through which the dry aggregate is passed. An array of precision radial bores or ducts drilled through the ring to surround the axis of aggregate flow are connected at their outer ends to a pressurized fluid manifold to spray the fluid against the aggregate flowing within. The fluidized aggregate then flows through a mixing area which typically expands and contracts the diameter of the flowing mix after which it is passed through a discharge nozzle at high speed directed at a target form. The small fluid ducts are prone to clogging at both ends with particulate matter which can be carried either in the fluid or in the aggregate and when clogged, are often difficult to clean. Moreover, the circumferential spacing of the drilled ducts can result in dry patches in the mix because of the extremely short time interval between the injection of the fluid and the discharge from the nozzle and the susceptibility to changes in the pressure differential between the fluid and the aggregate. The prior art devices are particularly difficult to use and control when the aggregate is injected with unpolymerized plastic to form concrete which is resistant to corrosion and erosion.

SUMMARY OF THE INVENTION

The present invention comprises a fluid ring which provides annular channels in a variety of configurations for establishing a substantially continuous, inwardly flowing fluid sheet to impinge on the aggregate from all directions at all points. The volume of flow can be controlled with absolute precision by defining the width of the fluid slot formed by the ring. The fluid ring when disassembled for cleaning presents a fully exposed substantially continuous annular surface which can be easily wiped clean.

In accordance with the invention the fluid slot can take a variety of shapes to achieve a range of fluid flow patterns and characteristics. The basic torodial slot configuration formed by one preferred embodiment of the invention results in an inherent nozzle effect in which the fluid flow proceeding radially inwardly from a larger outer circumference to a smaller internal circumference generates increased velocity at the point of impingement on the aggregate for any given fluid pressure in the manifold. The slot pattern can be modified if desired to provide for expansion of the flow area in the slot proceeding radially inwardly or it can provide a uniform velocity which is characteristic of the conventional drilled holes or bores in the water rings. Moreover, the flow pattern from the manifold to the aggregate can be directed to achieve tangential components relative to the aggregate, the dyanmics of which results in the generation of spinning forces causing the aggregate to turn on its axis in much the same manner as rifling in a gun causes a bullet to rotate. It is also possible in accordance with the invention to elongate the distance over which the fluid is injected into the aggregate by forming the slot as a helix.

The critical width of the fluid slot can be defined in accordance with one embodiment of the invention by opposing annular faces formed respectively in the fluid body and on the fluid ring. In another embodiment the width of the slot is defined by forwardly-projecting spacing shoulders on the fluid ring. Such shoulders can be contoured and shaped to achieve a variety of fluid flow characteristics such as tangential components of flow and to effect either expansion or compression.

BRIEF DESCRIPTION OF THE DRAWINGS

FIG. 1 is a view in longitudinal section along the axis of a fluid body fitted with a fluid ring illustrating the present invention and showing the body connected at one end to a discharge nozzle and at its other end to a hose through which the aggregate is pumped from its source.

FIG. 2 is a view in cross section taken on the line 2—2 of FIG. 1 and which passes through the plane of a fluid slot defined by the ring and the body.

FIG. 3 is a view in longitudinal section through a differently designed fluid body and in which is shown a fluid ring of different design.

FIGS. 10, 10A and 10B show a fluid ring of modified design in which the ring is formed of three pieces defining a helical fluid slot.

FIG. 11 is a side view of an elongated water ring defining or embodying a helical slot configuration.

FIG. 12 is a view in longitudinal section of a fluid body containing a fluid ring which together define a fluid flow path which is inclined in the direction of aggregate flow.

Referring to FIG. 1, the invention is illustrated as embodied in a fluid body 20 which is a cylindrical sleeve to the forward end of which is attached the means of a threaded lock ring 21, a discharge nozzle 22 for fluidized aggregate such for example as shotcrete which is a mixture of cement, sand and, by the action of the fluid body, water. The nozzle 22 can embody mixing chambers (not shown) and is typically formed of a flexible material such as rubber. To the other end of the fluid body there is threadedly attached a clamping sleeve 23 into which is fitted a flexible aggregate hose 24 secured by locking screws 25 and which has an internal diameter corresponding to that of the fluid body and the nozzle. The aggregate hose is adapted to be connected at its other end to a source of aggregate such for example as a dry cement mix pumped at high velocity from a storage source (not shown). A rubber washer 26 seals the input end of the fluid body and the rubber nozzle 22 forms its own seal for the output end.

Figure 4:
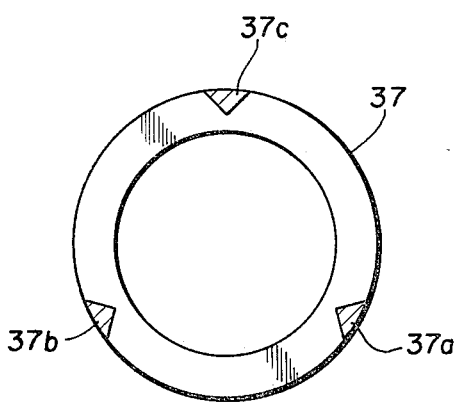
FIG. 4 is a view in cross section taken on the line 4—4 of FIG. 3 looking in the direction of the arrows to show the working face of the fluid ring.

Concentrically seated in the fluid body 20 is a fluid ring 27 formed with a shoulder 28 which abuts against an internal annular shoulder 29 formed in the fluid body 20. The compressible end 22a of the nozzle 22 under the force of the lock ring 21 presses the shoulders into engagement and forms a fluid tight seal at the joint line. An annular recess 30 formed in the fluid body 20 surrounds the outside diameter of the fluid ring 27 and defines an annular fluid manifold 31 surrounding the ring. A fluid fitting 32, including a valve 33, is tapped into the fluid body 20 to communicate with the manifold 31. Connected to the input of the valve 33 is a source of fluid under regulated pressure (not shown) and which in a typical case can be water, an unpolymerized plastic, as used in the case of plastic shotcrete, or a gas such as air. The latter is used in systems in which a previously wetted aggregate is being pumped substantial distances and there is need to break down compacted lumps for effective placement by nozzle discharge. In the more usual cases, however, the fluid is a liquid to be mixed with a dry cementitious mix to activate the mix to form a material capable of being shot from a nozzle and to be self-adhering against a placement surface such as a wall. The proportions of liquid and dry mix are highly critical. A dry mix will result in bouncing of the material from its target as well as poor hardening characteristics. A mix which is too wet will splash and run after placement. Successful shotcreting, also referred to as "guniting" in the trade, is largely dependent upon the skill of the operator both as to manipulation of the nozzle and achieving critical working proportions in the mix.

The fluid path from the manifold 31 to the aggregate takes place in accordance with the present invention through an annular slot 34 defined by the forward face 35 of the fluid ring 27 and an opposing face 36 formed in the fluid body 20. In the embodiment of FIG. 1 the critical width of the slot 34 is defined by the precision shoulders 28 and 29, respectively, of the fluid body 20 and fluid ring 27. Due to the radial characteristics of the annular slot 34 the velocity of the fluid will increase as it moves inwardly from the manifold toward the aggregate in direct proportion to the difference between the inside and outside diameters of the ring.

FIG. 3 illustrates another embodiment of the invention in which the critical dimension of the fluid slot is built into the ring design, as opposed to the use of complementary positioning shoulders on the ring and the body as used in the embodiment of FIGS. 1 and 2. To this end, the water ring 37 takes the form of a cylindrical sleeve fitted into a circular opening 38 in the fluid body 39 and carrying forwardly projecting stop shoulders 37a, 37b and 37c which engage a precision radial face 40 formed in the fluid body. The fluid ring 37 is held in place and sealed by the nozzle in the same manner as illustrated in FIG. 1. A liquid slot 41 similar to the slot 34 of FIG. 1 is thereby formed to couple a fluid manifold 42 to the central passage for the aggregate.

The positioning shoulders 37a, 37b and 37c are disposed near the outer edge of the fluid ring 37 and terminate radially outwardly of the inside edge to define a fluid path which completely surrounds the axis of flow, that is, the fluid will impinge on all of the exposed aggregate passing through the ring. The impedence set up by the shoulders in the fluid slot is inconsequential.

Figure 5:
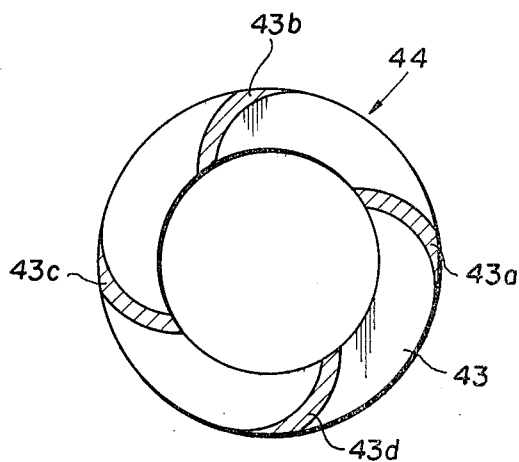
FIGS. 5 and 6 show modified designs of the fluid ring by means of which the fluid flow is given tangential components of direction.
Figure 6:
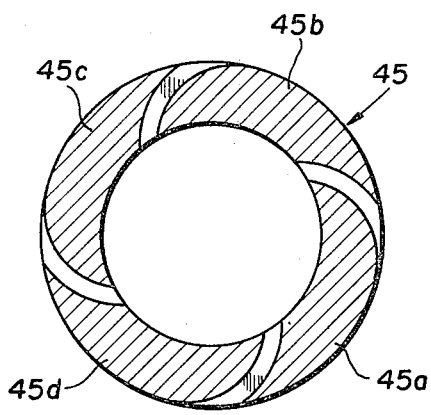

FIGS. 5 and 6 show other embodiments of the invention in which the ring positioning shoulders can be utilized to achieve the additional function of introducing tangential components to the fluid flow in addition to the purely radial component of the above described embodiments. The working face 43 a water ring 44 (FIG. 5) incorporates forwardly projecting shoulders 43a, 43b, 43c and 43d which extend the full distance between the outside and inside diameters of the ring and which have both radial and circumferential directional components to impart a rotational forces to the aggregate as it passes through the ring. The dimensions of the shoulders 43a, 43b, 43c and 43d are such that effect on the volume of fluid passing through the slot under a given set of pressure dimensions is minimal. In the embodiment of FIG. 6 the fluid ring 45 is formed on its working face with shoulders 45a, 45b, 45c and 45d which are wide relative to the widths of the fluid slots which they define and in this fashion define a series of fluid ducts 46a, 46b, 46c and 46d which create jets of fluid impinging at circumferentially spaced points on the aggregate passing through the ring. The shoulder reduces the exposure of the aggregate to the fluid, duplicating to some extent the action of conventional water rings in which radial bores are drilled through the body of the ring to connect the manifold to the aggregate path. It will be understood that the number of fluid paths can be substantially increased in the embodiment of FIG. 6 and that they can also take a wide variety of shapes and directions not achievable by radial drilling through the side of a conventional fluid ring.

Figure 7:
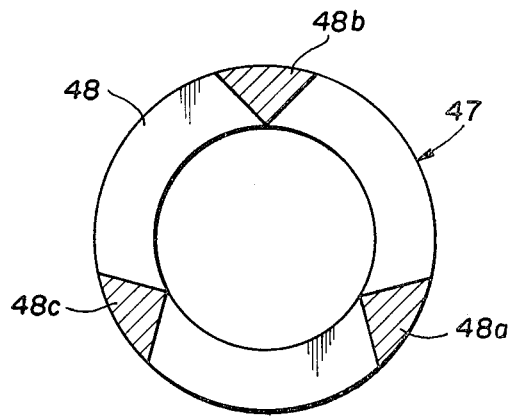
FIG. 7 is a view of the face of a fluid ring showing a modified shoulder design.
Figure 8:
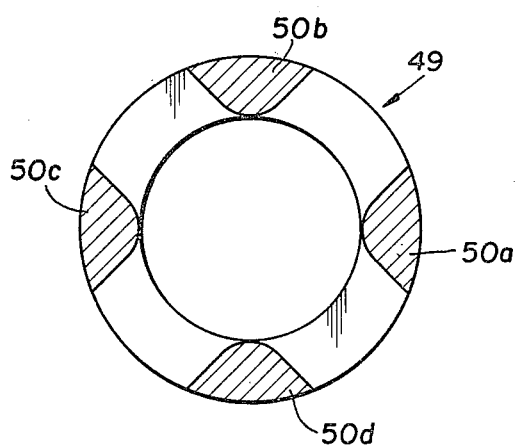
FIG. 8 is a view of the face of a fluid ring showing another modification of the shoulder design.
Figure 9:
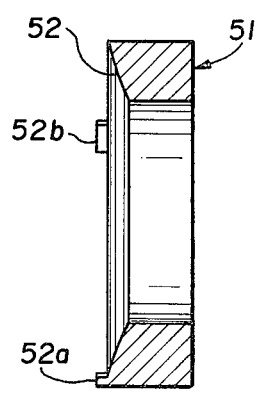
FIG. 9 is a view in vertical section of a fluid ring which defines a fluid flow path which expands axially of the direction of flow of aggregate.

Referring to FIG. 7, there is shown a fluid ring 47 the working face 48 of which is formed with shoulders 48a, 48b and 48c with convergent sides, the action of which is to establish relatively uniform velocity for the fluid flowing in the slot as it moves radially inwardly. A water ring 49 as shown in FIG. 8 includes contoured shoulders 50a, 50b, 50c and 50d which establish fluid slots which expand in area as they move radially inwardly, thus functioning as expansion nozzles. A water ring 51 as shown in cross section in FIG. 9 includes a contoured working face 52 which causes the fluid slot to expand in cross sectional area moving radially inwardly. Stop shoulders (52a and 52b are visible in FIG. 9) define the slot width. The flow path expands in the direction of aggregate flow, reducing flow velocity at the points of impact on the aggregate but increasing surface exposure.

Referring to FIGS. 10, 10A and 10B, there is shown an embodiment of the invention in which a fluid ring 53 is formed of three pieces 53a, 53b and 53c which together define a fluid slot 54 which is an offset helix. The central annular member 53a has its sides canted in opposite directions. Seated against the righthand end of the center member 53a is a second ring member 53b which has its opposing face canted identically to the opposing face of the member 53a. Approximately half of the working face is recessed by an amount corresponding to the width of the fluid slot, with the opposite half 55 defining a 180° spacing shoulder. A small supplemental stabilizing shoulder 56 is formed on the recessed side. A third ring member 53c is seated on the lefthand side of central member 53a as shown in FIG. 10 and includes a correspondingly canted working face with a spacing shoulder 57 extending 180° around the ring on the opposite side from that of the shoulder 55 on the ring 53b. A supplemental stabilizing shoulder 58 is formed on recessed side. With the three elements 53a, 53b, and 53c mated, there is thus defined a fluid slot in two offset sections 59 and 60 the form of one revolution of an offset helix. The three members are held together and secured against angular rotation by means of pins 61 passing through axial bores 62.

Referring to FIG. 11, a fluid ring in the form of an elongated cylindrical tube 63 is pierced by three diagonal cuts 64, 65 and 66 through its wall which collectively define a fluid flow path in the form of one revolution of a helix. It will be understood that the water body in order to accommodate the elongated structure of FIGS. 10 and 11 will necessarily be elongated to provide a longer fluid manifold 31.

Referring to FIG. 12, there is illustrated an embodiment of the invention in which the fluid path 67 is inclined in the direction of aggregate flow, with the slot being defined by inclined faces 68 and 69 formed respectively on the fluid ring 70 and the fluid body 71.

It would be understood from the above disclosure that the invention can take the form of a number of embodiments and arrangements and that it should not, therefore, be regarded as limited except as defined in the following claims.

I claim:

1. Apparatus for mixing a flowing aggregate with a fluid and discharging the mixture to a target for curing and hardening, the apparatus comprising a fluid body adapted to be connected at one end to an aggregate conveying hose and connected at its other end to a discharge nozzle and including wall means defining an internal annular fluid manifold adapted to be connected to a source of fluid under pressure;

wall means defining an axial bore of substantially the same size as the inside diameter of the hose and coaxial therewith and an annular wall perpendicular to the axis of the bore and extending from the manifold to the edge of the axial bore;

a fluid metering ring seated in the fluid body having an axial bore of the same size and aligned with the axial bore of the fluid body and having an annular surface perpendicular to the axis of flow spaced from and parallel to the perpendicular annular wall of the fluid body to define a fluid metering slot surrounding the flow of aggregate and connected to the fluid manifold;

an annular spacing rib on the outer surface of the fluid ring and extending radially outward therefrom;

a radially inwardly projecting rib carried by the fluid body having a surface perpendicular to the flow of aggregate and adapted to be engaged by an opposed surface on the rib of the fluid ring, the positions of the two opposing rib surfaces with respect to the annular wall being precisely determined to determine the width of the annular slot conveying fluid from the manifold into the aggregate; and means to attach the nozzle to the fluid body to bring the inner end of the nozzle into engagement with the forward edge of the fluid ring to bring the opposing surfaces of the ribs into tight engagement.

* * * * *